United States Patent [19]
Garnier

[11] Patent Number: 5,978,777
[45] Date of Patent: Nov. 2, 1999

[54] ELECTRONIC SYSTEM FOR SELECTIVE PRESENTATION OF INFORMATION AT A PLACE OF SALE

[75] Inventor: Dominique Garnier, L'Isle-Adam, France

[73] Assignee: Parfums Christian Dior, France

[21] Appl. No.: 08/955,158

[22] Filed: Oct. 21, 1997

[30] Foreign Application Priority Data

Sep. 9, 1997 [FR] France ................... 97 11165

[51] Int. Cl.⁶ .................. G06F 15/40; G06K 9/18
[52] U.S. Cl. .............. 705/27; 235/375; 235/381; 235/383
[58] Field of Search ............. 705/27; 235/375, 235/381, 383

[56] References Cited

U.S. PATENT DOCUMENTS 4,780,599  10/1988  Baus ........................... 235/383
5,652,421   7/1997  Veeneman et al. .......... 235/381

FOREIGN PATENT DOCUMENTS 0 167 072  6/1984  European Pat. Off. ....... G06K 17/00
2 739 241  9/1995  France .......................... H04M 11/00
WO 92 02920  7/1990  WIPO ............................. G06F 27/00

Primary Examiner—James P. Trammell
Assistant Examiner—Nga B. Nguyen
Attorney, Agent, or Firm—Blakely Sokoloff Taylor & Zafman

[57] ABSTRACT

An electronic system for presenting information relating to products on offer at a place of sale comprises: a central unit; a mass memory containing image sequences respectively associated with products belonging to a given group from amongst the products on offer at the place of sale; a display device; and a bar code or other reader to which a particular item on sale can be presented. The central unit includes a comparator for comparing a product code delivered by a reader with a series of product codes corresponding respectively to the products in the group. The central unit causes the sequence of images associated with the presented item to be run when the product code is contained in the series of product codes, and otherwise it displays a non-correspondence message. The system is particularly applicable to promoting perfumery.

7 Claims, 2 Drawing Sheets

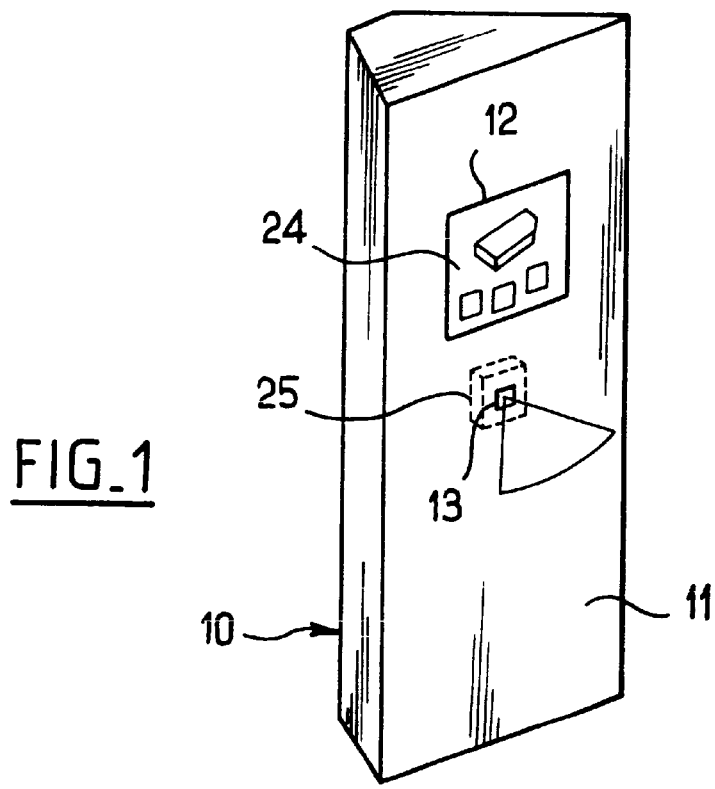
FIG_1
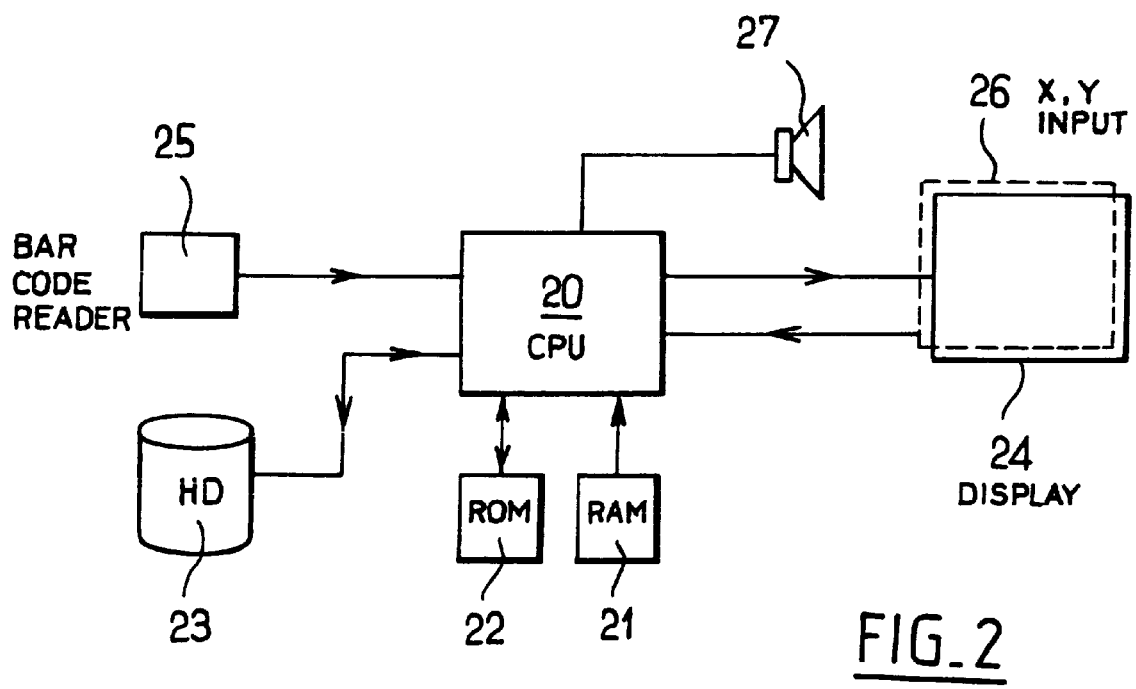
FIG_2

ELECTRONIC SYSTEM FOR SELECTIVE PRESENTATION OF INFORMATION AT A PLACE OF SALE

BACKGROUND OF THE INVENTION

Various electronic systems are presently known for enabling consumers to obtain information about goods or services on offer at a given place of sale.

Typically, such a system comprises a CPU having the usual memories, an input device such as a keyboard, a display screen, and loudspeakers.

When the consumer presses on a particular key of the keyboard, the CPU causes the screen to display a sequence of still or moving images, optionally accompanied by a sound track.

Nevertheless, that system is disadvantageous in that it requires the consumer to act on keyboard, which can be off-putting.

Another known system, that is in use in large stores, enables a consumer to verify that the price displayed on the shelves for an item does indeed correspond with the price which will be applied at the checkout. That system comprises a bar code reader to which the item to be verified is presented, and a display screen for telling the consumer the price presently associated with that item in the central computer of the store.

A drawback of that known system lies in that the information given is extremely restricted, and in that it can be used with all of the goods in the store. This makes it completely unsuitable for promotional applications, and in particular for selective applications concerning a given group of goods, such as goods sold under the same trademark.

OBJECTS AND SUMMARY OF THE INVENTION

The present invention seeks to propose a novel information presentation system capable of giving promotional or advertising type information while also offering the facility of making use of the bar codes carried by the various items.

Thus, the present invention provides an electronic system for presenting multimedia information about products on offer at a place of sale, the system comprising in combination:

a central unit;

a mass memory containing a series of still and/or moving image sequences respectively associated with products belonging to a given group of products selected from amongst all the products on offer at the place of sale;

a display device; and a reader for reading machine-readable information carried by the products on offer, and in front of which a particular item can be presented;

wherein the central unit includes comparator means for comparing a product code delivered by said reader from machine-readable information read on an item presented by a consumer with a series of product codes corresponding respectively to the products of said group; and wherein the central unit is suitable for causing the sequence of images associated with the presented item to be caused to run when the product code thereof is contained in said series of product codes, and otherwise to display a message of lack of such containment.

Preferred but non-limiting features of the system are the following:

the system contains a correspondence table between said series of product codes and the addresses of sequences of images in the mass memory;

the display device is a touch-sensitive screen and the image sequences are interactive sequences;

the system also includes means for playing back sound in association with each sequence;

the system is housed in a housing and only the display device and the location of said reader for reading machine-readable information are visible to the consumer;

the group of products includes only products under the same trademark;

the products are cosmetics, perfumes, or toiletries; and said machine-readable information is constituted by a bar code.

BRIEF DESCRIPTION OF THE DRAWINGS

Other aspects, objects, and advantages of the present invention appear more clearly on reading the following detailed description of a preferred embodiment thereof, given by way of example and with reference to the accompanying drawings, in which:

FIG. 1 is a diagrammatic perspective view of an information presentation system of the invention;

FIG. 2 is a block diagram of the electronic architecture of the information presentation system.

MORE DETAILED DESCRIPTION

Figure 3:
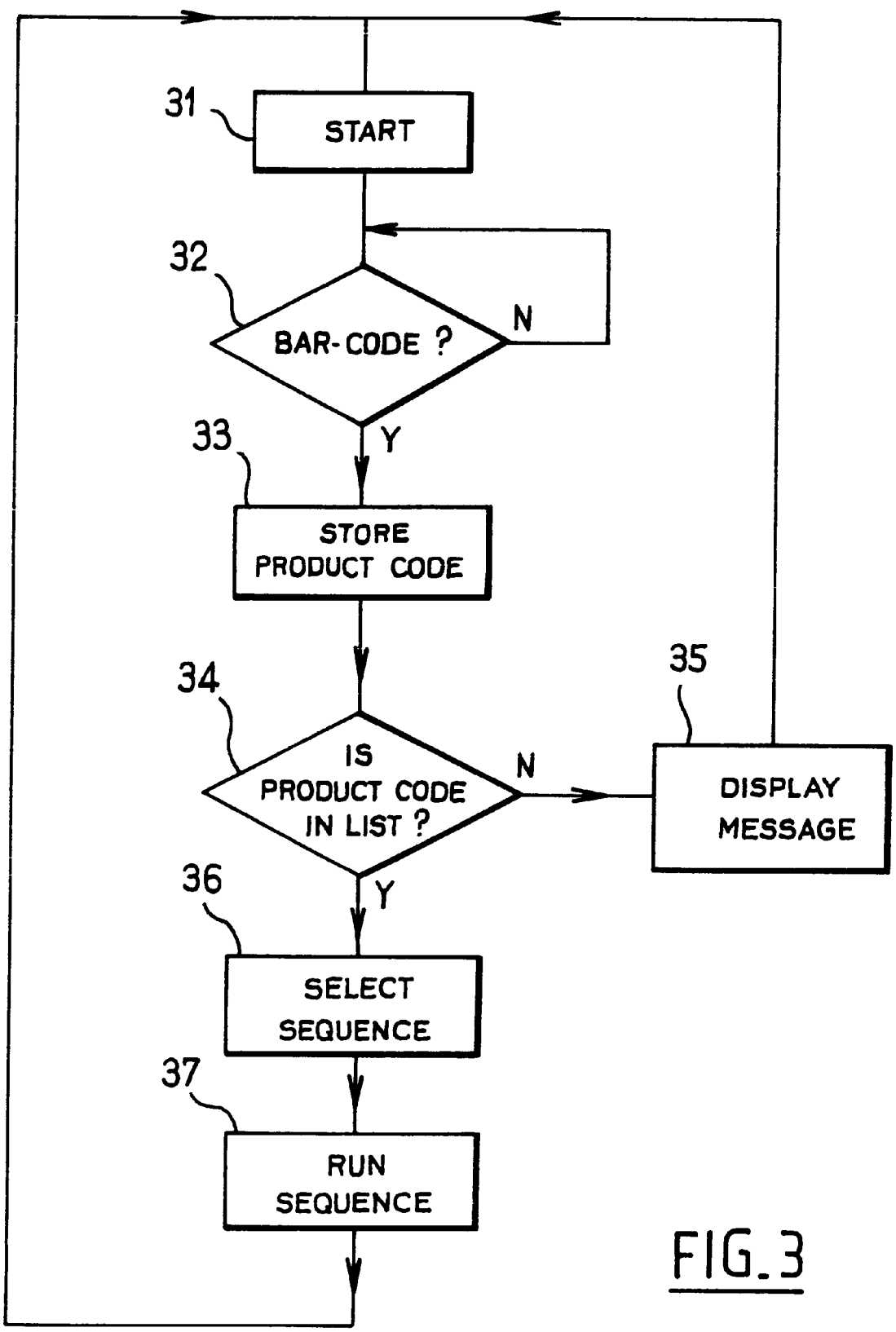
FIG. 3 is a flow chart illustrating certain functions of the system of FIGS. 1 and 2.

With reference initially to FIG. 1, there is shown an electronic information presentation system on a place of sale and comprising, in outline, a housing 10 that is generally in the form of a columnar booth, e.g. having a height of about 2 meters, with a front face 11 that possesses a window 12 for viewing a display screen 24. The window and the screen are placed at eye height. Beneath the screen there is provided, behind the front face, a fixed device 25 for reading bar code, of conventional type, and looking forwards from the housing via a small opening 13.

FIG. 2 shows the electronic architecture of the system, which essentially comprises a central processor unit (CPU) 20 connected to memories, and in particular a read/write memory (RAM) 21, a read-only memory (ROM) 22, and a mass memory such as a hard disk (HD) 23.

The CPU 20 is also connected via appropriate input/output or interface devices (not shown) to the display screen 24, e.g. of the color liquid crystal type, and to the bar code reader device 25.

The system also has an X,Y coordinate detection device 26 superposed on the screen 24, so as to provide a touch-sensitive screen in conventional manner.

Finally, the system includes sound playback means via one or more loudspeakers 27 for playing back sound data stored in the mass memory 23.

Advantageously, the above-described architecture is built around conventional personal computer components of the "PC" standard, with the bar code reader device being connected thereto via a serial interface.

The essential functions of the system whose structure is described above are described in detail below, more particularly with reference to FIG. 3.

Firstly, the mass memory 23 contains a plurality of sequences of still and/or moving images respectively associated with a series of products from a given manufacturer or a given group of manufacturers.

Each of the sequences is identified by an address which is correlated by means of an appropriate table with the product code of the product to which the sequence applies.

The sequences may be constituted, in particular, by promotional or explanatory sequences relating to each of the products.

Also, the CPU 20 is designed to compare the product code given by the reader device 25 whenever an item is presented to the front of the reader with the list of product codes in the above-mentioned series of products.

The flow chart of FIG. 3 has a "start" box 31 followed by a "test" box 32 in which the system waits for a product code to be delivered by the reader device 25. The code is transmitted to the CPU 20 by the reader 25 as soon as a user places an item, and more specifically the face of that item's packaging which carries its standard bar code (UPC or EAN code) to the opening 13 in the front face and the reader 25 has managed to read the code.

The product code is then stored in the RAM 21 and the CPU compares it with the codes contained in the sequence access table (box 34).

When the product code is not in the table, then the CPU 20 causes (box 35) a still or moving message to be displayed on the screen 24, which message is taken from the mass memory 23 and informs the consumer that the product is not one of the products associated with the system. In other words, the consumer is informed that the product is not a product under the trademark(s) with which the display system is associated.

The system then goes back to waiting for a new bar code to be read.

Otherwise, if the item presented by the consumer does indeed correspond to one of the trademarks of the display system, i.e. if its product code is contained in the table giving access to the presentation sequences, then the CPU 20 selects the appropriate sequence (box 36) and causes it to run on the screen 24 (box 37), with the corresponding sound track being played through the loudspeaker 27.

When the sequence has finished running, the system returns to its starting state.

It should be observed at this point that the sequences displayed on the screen can be interactive sequences, thus enabling the user to make use of a finger to interact with the X,Y detection device, thereby making choices that enable the user to navigate through the sequence, choose a language, etc. . . . . .

Also, the system may advantageously include welcome sequences or images that run while the system is waiting for a product code, serving to tell consumers which products or families of products are associated with the display system, and to explain how to operate the system.

The present invention is particularly applicable to advertising and promotion on a place of sale, making it possible, in association with the universal product code present on each of the items displayed for sale, to associate the display system with a given family of products only, for example products sold under the same trademark.

The invention is thus particularly advantageous for use in the field of cosmetics, perfumes, and toiletries.

Naturally, the invention is not limited in any way to the embodiment described above and shown in the drawings, and the person skilled in the art will be able to make any variant or modification within the spirit of the invention.

In particular, when the products on sale are identified as described above by means of a bar code, it is possible in a variant to use any machine-readable code, based, in particular, on reading by optical, magnetic, radio, etc. means.

I claim:

1. An electronic system for presenting multimedia information about products on offer at a place of sale, the system comprising in combination:

a central unit;

a mass memory containing a series of still and/or moving image sequences respectively associated with products belonging to a given group of products selected from amongst all the products on offer at the place of sale;

a display device; and a reader for reading machine-readable information carried by the products on offer, and in front of which a particular item can be presented;

wherein the central processing unit includes comparator means for comparing a product code delivered by said reader from machine-readable information read on an item presented by a consumer with a series of product codes corresponding respectively to the products of said group;

wherein the central unit is suitable for causing the sequence of images associated with the presented item to be caused to run when the product code thereof is contained in said series of product codes, and otherwise to display a message of lack of such containment; and wherein the group of products includes only products under the same trademark.

2. A system according to claim 1, containing a correspondence table between said series of product codes and the addresses of sequences of images in the mass memory.

3. A system according to claim 1, wherein the display device is a touch-sensitive screen and wherein the image sequences are interactive sequences.

4. A system according to claim 1, also including means for playing back sound in association with each sequence.

5. A system according to claim 1, housed in a housing and wherein only the display device and the location of said reader for reading machine-readable information are visible to the consumer.

6. A system according to claim 1, wherein the products are cosmetics, perfumes, or toiletries.

7. A system according to claim 1, wherein said machine-readable information is constituted by a bar code.

* * * * *

UNITED STATES PATENT AND TRADEMARK OFFICE
CERTIFICATE OF CORRECTION

PATENT NO.   : 5,978,777
DATED        : November 2, 1999
INVENTOR(S)  : Garnier

It is certified that error appears in the above-identified patent and that said Letters Patent is hereby corrected as shown below:

Item [56], line 8 delete "WO 92 02920 7/1990 WIPO............G06F 27/00" and insert-- WO 92 02920 7/1990 WIPO...........G09F 27/00--.

Item [57], line 8, delete "delivered by a reader" and insert --delivered by said reader--.
Item [57], line 12, delete "the series of" and insert --said series of--.

Signed and Sealed this

Nineteenth Day of June, 2001

*Attest:*

*Attesting Officer*

NICHOLAS P. GODICI
*Acting Director of the United States Patent and Trademark Office*